United States Patent [19]

Hulyalkar et al.

[11] 4,228,058

[45] Oct. 14, 1980

[54] FLAME RETARDANT LATEXES

[75] Inventors: Ramchandra K. Hulyalkar, Oakland, N.J.; Rodrigue V. Lauzon, Seabrook, Tex.

[73] Assignee: Syntex (U.S.A.) Inc., Palo Alto, Calif.

[21] Appl. No.: 921,377

[22] Filed: Jul. 3, 1978

Related U.S. Application Data

[63] Continuation-in-part of Ser. No. 840,945, Oct. 11, 1977, abandoned.

[51] Int. Cl.$^2$ .................. C09D 3/74; C09D 3/76; C09D 5/02; C09D 5/18
[52] U.S. Cl. ............... 260/29.7 UA; 260/29.7 W; 260/DIG. 24
[58] Field of Search ........... 260/29.7 UA, 29.7 W, 260/DIG. 24

[56] References Cited

U.S. PATENT DOCUMENTS

| | | | |
|---|---|---|---|
| 3,448,173 | 6/1969 | Ryan et al. | 260/29.7 UA |
| 3,546,059 | 12/1970 | Isgur et al. | 428/235 |
| 3,595,940 | 7/1971 | Kuhne et al. | 260/29.7 UA |
| 3,645,926 | 2/1972 | Dunlop | 260/29.7 UA |
| 3,740,357 | 6/1973 | Wax | 260/29.7 T |
| 3,897,387 | 7/1975 | O'Shaughnessy | 260/29.7 UA |
| 3,962,170 | 6/1976 | Mally | 260/45.7 P |
| 3,970,629 | 7/1976 | Izaki et al. | 260/29.7 H |

FOREIGN PATENT DOCUMENTS

| | | | |
|---|---|---|---|
| 48326 | 6/1964 | Poland | 260/29.7 UA |
| 635986 | 4/1950 | United Kingdom | 260/29.7 UA |
| 734392 | 7/1955 | United Kingdom | 260/29.7 UA |

*Primary Examiner*—Ronald W. Griffin
*Attorney, Agent, or Firm*—Joseph I. Hirsch; John A. Dhuey

[57] ABSTRACT

Flame retardant latex bases having an excellent balance of properties are prepared most efficiently and economically by blending together two separately polymerized latexes of different types, the polymeric content of one of said latexes being formed predominantly from a monomer mixture consisting of from about 70 to about 92% by weight vinylidene chloride and 8 to 30% by weight of certain polar comonomers principally of the lower alkyl acrylate class while the polymeric content of the second latex is formed from a monomer mixture consisting predominantly of styrene and butadiene. This technique of producing the desired flame retardant latex bases by combining two separately prepared but simpler component latexes not only maximizes quality control and manufacturing flexibility but also permits the simultaneous realization of higher conversions and reduced polymerization cycles or residence times so that productivity is also maximized.

Provided the solids contents of the two separately polymerized latexes are fairly close to each other (i.e. somewhere near the usual range of about 40 to 50% by weight), then latex bases of commercial interest can be formed by blending the vinylidene chloride copolymer latex with from about 1/9th to about 4 times its weight of the styrene-butadiene latex so that vinylidene chloride represents from about 20 to 80% by weight of the total polymer content of the resultant blend.

20 Claims, No Drawings

4,228,058

FLAME RETARDANT LATEXES

RELATED CASES

This application is a continuation-in-part of a application Ser. No. 840,945, filed Oct. 11, 1977, now abandoned.

This invention relates to flame retardant latexes especially adapted for formulating a wide range of flame retardant coating compositions. The subject latexes exhibit special utility and advantages when used as the bases for coatings to be applied to flexible substrates, e.g. carpet backings, fabric coatings and the like.

More particularly, our invention involves the provision of flame retardant latex bases having an excellent balance of properties including ease of compounding with a variety of fillers and additives, good coating action, adequate binding strength, flexibility and outstanding flame resistance at a given level of compounding. Novel methods of preparing said latex bases are also provided which not only yield manufacturing economies but also permit closer control and better reproducibility of product properties.

BACKGROUND

The field of flame retardant raw materials is currently undergoing rapid expansion and intensive development as the emphasis on safety is steadily increased and government regulations are made more stringent and expanded to cover additional industries and products. As a result many improvements have been made in coating materials to enhance their flame retardant character and performance. Most of these improvements have involved the incorporation of additional ingredients, component modifiers or synergistic combinations of same leading steadily to increasingly complex formulations, more complicated processing and concomitantly increasing costs.

For example, in attempting to enhance the flame retardancy of latex bases for coating applications such as carpet backings, the major prior art approach has been to include appreciable amounts of halogen containing monomers in a complex monomer mixture which is all polymerized together to form an elastomeric latex. Representative prior art disclosures illustrating this basic approach are found in U.S. Pat. Nos. 3,546,059 to Isgur et al. and 3,962,170 to Mally wherein vinylidene chloride is the halogen containing monomer and it is copolymerized with at least an equal amount by weight and generally more of at least three other monomers chosen mostly from conventional elastomeric comonomer combinations, such as butadiene (or any other diene) plus styrene (or acrylonitrile) together with minor amounts of such functional monomers as unsaturated carboxylic acids. The resulting complex copolymer latexes evidently function well as flame retardant binders for coating carpets and other flexible substrates. However, the multicomponent copolymerizations employed therein are inherently complicated and require intricate measures are careful control in order to obtain uniform products. In fact, a study of the working examples in said patents reveals that considerable amounts of the monomers (about 10% or more) remain unreacted even after extended polymerization runs (e.g. 10 hours or even longer). Therefore, special monomer removal steps and finishing treatments would be necessary to produce commercially acceptable latexes from such prior art polymerizations.

Accordingly, a major object of this invention is to produce strongly flame retardant latex bases in a highly efficient and economical manner. Fundamental to this object is the performance of the necessary polymerization reactions under simplified conditions insuring more complete monomer conversions and reduced overall polymerization cycles. A related object is to permit the polymerization involved to be regulated more closely and thus achieve more selectively and greater reproducibility in regard to the critical parameters of the finished products. Another object is to simplify monomer removal problems and reduce the finishing and purification costs otherwise incurred therefrom.

A special object is to provide stable latex bases of exceptional versatility and wide utility in highly flame retardant coating compositions, including those suited for use on carpets, fabrics and other flexible substrates.

Various other objects and advantages of this invention will be apparent from the complete description thereof which follows.

SUMMARY OF THE INVENTION

The above objects are attained in accordance with the present invention by polymerizing vinylidene chloride separately from the primary prior art comonomers (i.e. butadiene and styrene) with a limited proportion of polar comonomer predominantly of the lower alkyl acrylate type under carefully controlled conditions which quickly yield a substantially completely reacted and nearly monomer free, preliminary latex and subsequently blending said preliminarly latex with a separately polymerized butadiene-styrene type of latex. More specifically, the vinylidene chloride is copolymerized with such polar comonomers in an acidic emulsion at very moderate temperatures and pressure using a suitable redox-type water-soluble catalyst to produce a stable preliminary aqueous latex containing between about 35 and 50% by weight of a resinous copolymer made up of between about 70 and 92% by weight, and preferably between 80 and 90% by weight, of vinylidene chloride units but having no more than about 500 ppm of residual vinylidene chloride monomer present. The finished latex base is then formed by blending said preliminary latex with at least about 1/9th but not over about 4 times its weight of a separately produced, stable aqueous latex containing between about 35 and about 55% by weight of a copolymer derived primarily from butadiene and styrene, and at least 10%, and preferably at least 25%, by weight of which is derived from butadiene and at least 30% by weight from styrene.

The latter styrene-butadiene type of latex can be prepared by following various known aqueous emulsion polymerization techniques. However, in dispersing the monomers in the aqueous medium, synthetic anionic surfactants should be used rather than resin or fatty acid soaps. Preferably, the synthetic anionic surfactants used should be acid stable and ideally will be the same or closely similar to those used in preparing the preliminary vinylidene chloride copolymer latex. The polymerization of the styrene, butadiene and any minor functional monomers should be effected with the aid of water-soluble, free-radical catalyst which decomposes under the influence of heat to give polymerization initiating free-radicals. Optionally, said free-radical catalysts are used in combination with reducing agent promoters which help to activate the free radical release at lower temperatures. Other common practices which can also be followed in preparing the latter latex are: (1) the use of a small amount of preformed seed latex to help control practice size, (2) mercaptans or other chain transfer agents for molecular weight control, (3) buffering electrolytes and protective colloids for better pH control and emulsion stability and (4) the use of incremental or supplemental additions of emulsifiers, catalysts or certain monomers to help regulate and adjust product composition and properties.

The main composition parameters for the styrene-butadiene latex are that the weight proportions of styrene/butadiene should fall between about 9/1 and 1/2 (preferably between about 3/1 and 1/1.5). and that any minor functional monomers incorporated therewith should account for no more than about 5% by weight of the total polymer content. The preferred functional monomers are low molecular weight unsaturated acids like acrylic, methacrylic, itaconic, etc. and low molecular weight unsaturated amides like acrylamide and methacrylamide or N-substituted derivates thereof, such as N-methylolacrylamide.

The copolymerization of the styrene and butadiene, with or without the minor amount of functional monomer, is readily conducted in a conventional jacketed reactor equipped with a suitable agitator using moderate reaction temperatures and pressures, i.e. generally less than 85° C. and 200 psig. Usually, reaction temperatures between about 50° and 80° C. and pressures below about 100 psig are preferred in order to achieve conversions of at least 95% with residence times of less than about 12 hours.

DETAILED TECHNICAL DISCLOSURE

One of the principal keys to achieving the advantages and economies of the present invention resides in the simple, efficient and convenient method of preparing the preliminary latex containing the resinous polymeric solids derived predominantly from vinylidene chloride. Thus, we have found that vinylidene chloride + lower alkyl acrylate comonomer mixtures (containing about 70 to 92% by weight of vinylidene chloride) are most easily and rapidly copolymerized in a moderately acidic aqueous emulsion, i.e. one having a pH of below about 5 and preferably between about 3 and about 4. In fact, using an appropriate, water-soluble redox catalyst in such a medium, the vinylidene chloride and alkyl acrylate comonomers polymerize together so readily and thoroughly that both monomers are nearly completely consumed within a relatively short residence time even at moderately low temperatures. This copolymerization reaction should be limited to the aforesaid vinylidene chloride + lower alkyl acrylate comonomers (i.e. the $C_1$ to $C_8$ alkyl acrylates), except for the option of including a very minor amount (i.e. up to about 2% by weight) of a low molecular weight unsaturated carboxylic acid monomer, such as acrylic acid.

Since the vinylidene chloride and lower alkyl acrylates are all liquids at ordinary room temperatures, the emulsification of such comonomers in a suitable aqueous medium and the subsequent emulsion copolymerization thereof can be readily carried out using relatively simple equipment, such as a conventional, stirred and jacketed, reaction kettle having suitable charging and discharging connections, provisions for heat transfer and means for measuring and regulating temperatures and pressures. The inside of the main reactor shell is usually either of stainless steel or is lined with glass to avoid contamination or corrosion problems.

The emulsification of the aforesaid liquid monomers is effected by agitating said monomers with at least equal amounts by weight of water (and preferably slightly more) containing sufficient amounts of an active, oil-in-water surfactant to form a stable, fine emulsion characterized by a uniform micelle network of dispersed monomer material. However, in forming the present slightly acidic, aqueous emulsion of the vinylidene chloride monomer mixtures, it is important to select a compatible surfactant which is effective at pH's below 5. Accordingly, the relatively acid-stable, anionic surfactants should be used for this purpose since they are both compatible and effective in reasonable concentrations (usually between about 1 and about 2% by weight of the total water present). A particularly useful class of such anionic surfactants comprises the $C_6$ to $C_{12}$ alkyl and cycloalkyl esters and diesters of certain alkali metal sulfonates of simple alkanedioic acids, such as sodium sulfosuccinic acid, e.g. dicyclohexyl sodium sulfosuccinate. Other suitable emulsifiers are the alkyl sulfate and alkylaryl sulfonate classes.

After a stable emulsion of the aforesaid monomers has been effected, the pH thereof should be checked, and adjusted if necessary, before introducing the polymerization catalysts or initiators. For example, small amounts of acid (such as citric, acetic or hydrochloric) and/or acidic buffering salts, such as monopotassium orthophosphate, can be added to attain the desired acidic polymerization conditions of approximately 2 to 5 pH. This is also a convenient, though optional, stage for the addition of any other desired minor modifying additives which have not already been introduced such as chain transfer agents or other polymerization modifiers or regulators.

The actual polymerization of the emulsified vinylidene chloride containing monomers is effected by means of a water-soluble redox catalyst consisting of two separately introduced parts, the first being a peroxy type, free radical initiator i.e. a peroxide, a peracid or an ammonium or alkali metal salt of a peracid and the second being a reducing agent for said peroxy component. Although salts of certain multi-valent metals such as Fe, Co, Cr and Cu are prominent reducing promoters in many redox catalyst systems, such materials are not favored in the present situation since they can cause instabilities of the resultant latex products. We have found that by far the most suitable and effective redox catalyst system for the instant copolymerization of vinylidene chloride with lower alkyl acrylate ester comonomers is a combination of a simple water-soluble persulfuric type of free-radical initiator (e.g. an alkali metal persulfate) and a water-soluble sulfoxy type of reducing agent (e.g. an alkali metal sulfite, bisulfite, metabisulfite, thiosulfate or dithionite, also sometimes referred to as "hydrosulfite"). The use of such redox systems permits substantially complete copolymerization of said emulsified monomers at entirely safe temperatures and pressures in relatively short residence times yielding most attractive economic advantages for commercial production.

The total amount of our redox catalyst needed is generally less than 1% of the total weight of monomers charged to the process, with an optimum level for most of the better combinations of the types indicated hereinabove usually falling somewhere between about 0.3 and 0.7%. In most cases, the proportion of the reducing agent part is considerably less than that of the free radical initiators. Also, these redox systems become active at temperatures of approximately 30° to 40° C., with excellent polymerization rates being generally achieved in the range between about 40° and 60° C. Of course, polymerization temperatures can be permitted to rise somewhat above 60° C. for short periods of time without damage, e.g. in the latter stages of the reaction in order to minimize the overall residence time required to reach nearly complete conversion of all of the monomers. Because of the high activity of these catalysts and their relatively short induction period, and in view of the fact that the polymerization reaction is exothermic, the initial input of external heat to the emulsion polymerization mixture should be effected rather gradually and with particular caution as the temperature rises through the 35° to 40° C. range so that the removal of heat by means of jacket coolant can be started in time to prevent excessively rapid temperature increases due to the internal heat released by the exothermic polymerization reaction. By exercising good overall control over the heat transferred in both directions, the bulk of the polymerization reaction can be effected with the aforesaid redox catalyst systems at temperatures between about 35° and 65° C. with the majority of the monomer mixture being polymerized between about 40° and 60° C. Furthermore, under these conditions, the corresponding autogenous reaction pressures are also quite modest, i.e. less than about 50 psig. Incremental charging of one or both partners of the redox system can be practiced if desired, but such measures are not normally necessary to the achievement of the desired objective of substantial completion of polymerization of the monomer mixture within extremely reasonable reaction times, (e.g. of the order of only about 5 to 6 hours), without use of excessive reaction temperatures. For example, the prolonged use of reaction temperatures much above 65° is not necessary in this polymerization and should generally be avoided since some degradation of the resultant latex product could result therefrom. One extremely effective way to employ the redox catalyst system in this invention is to hold out from the initial charge up to one half of the total amount of each component to be used in a given run and use these reserve portions of catalyst to make two or three incremental additions of each component 30 to 60 minutes apart beginning after the first 3 to 4 hours of active polymerization have been accomplished.

With adequate heat transfer capacity, the emulsion polymerization mixture can be brought into the active initiation temperature range (generally about 35° to 40° C.) within less than 1 hour, after which the residence time required to complete the polymerization with a given catalyst system will depend largely upon the average temperature maintained. Operating with proper control mostly in the preferred range of about 40° to 60° C., substantially complete reaction can readily be attained within a total residence time of five to six hours in most cases, as indicated by a residual vinylidene chloride monomer content of less than 1000 ppm and preferably less than 500 ppm by weight.

The pH of the resulting vinylidene chloride + lower alkyl acrylate copolymer latex should then be checked and if (as is usually the case) it is below 4, it should be adjusted upwards by the addition of a small amount of aqua ammonia or other alkali. Preferably, its pH should be brought to at least about 4.5 and may be brought substantially to neutral or even made slightly alkaline before blending same with the separate styrene-butadiene type latex to produce the finished latex of this invention. Said blending step can be successfully accomplished even between a moderately acidic latex of one type and a moderately alkaline latex of the other type (e.g. between pH extremes of about 4.5 to about 9.5). However, it is preferred that the respective latexes have pH's of similar character at the time of mixing, especially if the relative amounts in which they are being combined differ widely.

Although the gains in production efficiency achieved by this invention with regard to the separate styrene-butadiene latex are not as dramatic as with the preliminary vinylidene chloride copolymer latex, some further, very worthwhile advantages are still realized. First of all, since the monomer mixture from which it is made is composed predominantly (i.e. over 95% by weight) of styrene and butadiene, the copolymerization reaction is inherently simpler and proceeds more smoothly to yield a reproducible latex product of adequate uniformity. Furthermore, higher temperatures can be used in the final stages of polymerizing these monomers without danger of heat degradation, so that it is possible thereby to reduce greatly the amount of unreacted monomers at the end of a run of normal duration, e.g. conversions of better than 98% of the total monomers supplied can be achieved instead of the usual level of below 90% shown for 10 to 12 hour runs in the prior art. Preferably, the bulk of the styrene-butadiene emulsion polymerization is carried out at temperatures in the range from about 50° to about 75° C., but somewhat higher temperatures can be used (e.g. up to 80°–85° C.) if desired in the final stages of a run in order to expedite such monomer conversions well beyond the 90% level. Of course, the small amounts of residual monomers still remaining can be readily removed by vacuum and/or steam stripping techniques well known in the art.

The preparation of the styrene-butadiene type latex can be conducted successfully over a fairly wide middle range of pH values (i.e. between about 4 and about 10). When small amounts of acidic functional monomers are included in the monomer mixture, the resulting aqueous emulsion tends to be moderately acidic and the polymerization reaction generally proceeds most readily and smoothly at a pH below 7. However, the reverse is generally true if no acidic monomers are included in the styrene-butadiene type latex formulation. If the styrene-butadiene type latex is polymerized at an acid pH, it is often advantageous to adjust its pH to the alkaline side after the run is over since most styrene-butadiene type latexes exhibit maximum stability thereby (e.g. at a pH somewhere around 9). Such adjustments are most readily achieved by merely adding a small amount of aqua ammonia or other alkali in a manner analogous to that already described in conjunction with the vinylidene chloride copolymer latex.

In addition to such pH adjusting additives, it is often advisable to add minor amounts of other types of known additives to either the individual latexes before blending and/or to the finished latex bases formed by blending. These include, for example, supplemental surfactants, defoamers and surface tension modifiers, protective colloids, thickeners and viscosity modifiers and heat stabilizers, antioxidants and sequestering agents.

For most important commercial applications, latex bases having the best balance of properties result from the practice of this invention when the vinylidene chloride copolymer latex is blended with from about 1/6 to about 3 times its weight of the styrene-butadiene latex, so that vinylidene chloride represents approximately 25 to 75% by weight of the overall polymer content of the resultant blended latex base.

In many of its ultimate commercial uses, such as in carpet backings, fabric coating and the like, the finished latex bases of this invention will be compounded before actual application with various mineral fillers, pigments, flame retardants, smoke suppressants, plasticizers, cross-linking agents, promoters, etc. Some of the most important of these compounding ingredients are talcs, clays, calcium carbonate, titanium oxides, antimony oxides, alumina hydrates, various phosphorous and boron compounds and many halogenated compounds and materials, including chlorinated waxes. In view of the wide variety of such traditional compounding ingredients available, the comprehensive surveys thereof already reported elsewhere and the general adaptability of the present latex bases to be compounded economically therewith at desirable loadings to give a relatively high level of performance, a detailed discussion of such compounding ingredients will not be attempted herein.

In order to insure a clearer understanding of the practice of this invention, several specific examples illustrating the detailed preparation of our latex bases are presented hereinafter. Some of these examples are also extended to illustrate the compounding of the finished latex base with representative fire retardant additives and fillers so as to demonstrate ultimate performance and practical utility thereof:

EXAMPLE 1

Using 4,000 gallon capacity dished head, glass-lined polymerization reactors of 90" inside diameter equipped with heat transfer jackets and turbine type agitators at three levels, two separate latexes were prepared by conducting aqueous emulsion polymerizations "A" and "B" using the following recipes and reaction conditions. In the tabulated recipes of this and all subsequent examples, the figures in the column headed "Parts by Wt." are based upon 100 parts by weight of total monomers.

| RECIPE A | | |
|---|---|---|
| Ingredient | Parts by Wt. | Amount Charged (lbs.) |
| Demineralized Water (total) | 169.00 | 18,600.0 |
| AEROSOL A-196[1] | 2.42 | 266.0 |
| Methyl Acrylate | 10.04 | 1,105.0 |
| Vinylidene Chloride | 89.96 | 9,900.0 |
| Citric Acid | 0.02 | 2.2 |
| Monopotassium Orthophosphate | 0.10 | 11.1 |
| Potassium Persulfate | 0.30 | 33.0 |
| Sodium Dithionite | 0.08 | 8.8 |
| | | 29,926.1 lbs (Total) |

[1] A proprietary surfactant of American Cyanamid Co. containing the cyclohexyl diester of sodium sulfosuccinic acid as the active ingredient. (85% solids content)

Dilute aqueous solutions of the two (redox) catalyst components were the final materials charged. Then the polymerization reaction was carried out starting with an initial pH of about 4 according to the following schedule, maintained by controlling the temperature of the heat transfer fluid in the reactor jacket while continuously agitating the reactor contents.

| Time (hrs.) | Temperature |
|---|---|
| 0.0 | 30° C. |
| 0.5 | 39° C. |
| 1.5 | 38° C. |
| 2.5 | 41° C. |
| 3.5 | 44° C. |
| 4.5 | 46° C. |
| 5.0 | 54° C. |
| 5.5 | 50° C. |

The maximum pressure generated during this 5.5 hour run was close to 25 psig and, during the final hour, it dropped rapidly to only about 2 psig. The residual vinylidene chloride monomer content at the end of the run was below 500 ppm. Other measurements on this latex gave the following results:

| Property | Value |
|---|---|
| Solids Content | 37% by wt. |
| pH[2] | 2.4 |
| Surface tension | 59 dynes/cm |
| Coagulum Content | negligible |

[2] Subsequently, the pH was raised to about 4.5 by small additions of aqua ammonia.

| RECIPE B | | |
|---|---|---|
| Ingredient | Parts by Wt. | Amount Charged (lbs) |
| Demineralized Water (total) | 111.40 | 13,980.0 |
| AEROSOL A-196 | 3.50 | 441.0 |
| Acrylic Acid | 1.50 | 188.0 |
| Itaconic Acid | 1.00 | 125.0 |
| Aqua Ammonia (29% NH$_3$)[3] | .30 | 35.0 |
| t-dodecyl mercaptan | .60 | 76.6 |
| Styrene | 61.90 | 7,773.0 |
| Butadiene-1,3 | 35.60 | 4,464.0 |
| Sodium Tripolyphosphate | 0.10 | 12.5 |
| Potassium Persulfate | 0.50 | 62.5 |
| | | 27,157.6 lbs (Total) |

[3] To neutralize part of acid monomers and raise initial pH to about 4.

REACTION CONDITIONS:

| Time (hrs.) | Temperature |
|---|---|
| 0 | 40° C. |
| 1 | 55° C. |
| 2 | 60° C. |
| 4 | 65° C. |
| 6 | 70° C. |
| 9 | 75° C. |
| 11 | 74° C. |

The pressure attained during this 11 hour run reached a maximum of close to 80 psig but had dropped under 10 psig by the end of the run. The latex at the end of the run was analyzed and found to contain about 0.5% residual styrene monomer by weight indicating more than 98% conversion of the original monomers. Its solids content and pH as made were about 47% by weight and 5.5 respectively. After this latex was passed through a vacuum-steam stripper to give an essentially monomer-free latex with a solids content of about 50% by weight, its pH was adjusted to about 9.

It was found that the acidic vinylidene chloride copolymer latex made from Recipe A as described above could be blended readily with the alkaline latex finally obtained from Recipe B without any sign of instability provided they were brought together gradually (e.g. as cocurrently fed proportioned streams). However, in order to insure coagulum free product when one latex was gradually added to a large pool of the other, it was necessary to adjust the pH of at least one latex so that both were of the same character at the time of mixing.

The following three finished latex bases were made by blending the two component latexes in the proportions shown after the pH of the vinylidene chloride copolymer latex had first been adjusted to about 8 by the addition of aqua ammonia:

| Finished Latex | Wt. Proportions Component A | Wt. Proportions Component B | Final Solids Content | % Solids from "A" | % Solids from "B" |
|---|---|---|---|---|---|
| Base 1 | 37% | 63% | 45% | 30% | 70% |
| Base 2 | 52.5% | 47.5% | 43% | 45% | 55% |
| Base 3 | 67% | 33% | 41% | 60% | 40% |

Uniform films were cast from each of the above latex bases, air dried and cured in an oven at about 110° C. Specimens of cured films were then tested in accordance with ASTM-D-2863 to determine their Limiting Oxygen Indexes, a measure of the minimum oxygen content required in oxygen-nitrogen mixtures to support flaming combustion. The results were as follows:

| Film Source | LOI Value |
|---|---|
| Base 1 | 22 |
| Base 2 | 24 |
| Base 3 | 26 |

Thus, even in the absence of any fillers or special flame retardant additives, none of these plain latex base films would be subjected to free-flaming combustion in ordinary air (containing only 21% oxygen).

EXAMPLE 2

Again two separate latexes were prepared as in Example 1 but using Recipes C and D and the particular reaction cycles set forth below:

| RECIPE C | | |
|---|---|---|
| Ingredients | Parts by Wt. | Amount Charged (lbs) |
| Demineralized Water (total) | 172.60 | 19,000.0 |
| AEROSOL A-196 | 2.42 | 266.0 |
| Methyl Acrylate | 10.04 | 1,105.0 |
| Vinylidene Chloride | 89.96 | 9,900.0 |
| Citric Acid | 0.02 | 2.2 |
| Monopotassium Orthophosphate | 0.10 | 11.1 |
| Potassium Persulfate | 0.50 | 55.0 |
| Sodium Dithionite | 0.15 | 16.5 |
| | | 30,355.8 lbs (Total) |

| REACTION CONDITIONS: | |
|---|---|
| Time (hrs.) | Temperature |
| 0 | 32° C. |
| 1 | 41° C. |
| 2 | 46° C. |
| 3 | 45° C. |
| 4 | 56° C. |
| 5 | 53° C. |

The latex product from the above run using Recipe C had a solids content of about 37% by weight, contained less than 500 ppm of vinylidene chloride monomer and was generally comparable in all respects to that produced from Recipe A in Example 1.

| RECIPE D | | |
|---|---|---|
| Ingredient | Parts by Wt. | Amount Charged (lbs) |
| Demineralized Water (total) | 106.30 | 13,867.0 |
| AEROSOL A-196 | 2.80 | 363.0 |
| Sodium Tripolyphosphate | 0.10 | 17.3 |
| Acrylamide | 1.65 | 217.0 |
| Acrylic Acid | 0.25 | 32.5 |
| t-dodecyl mercaptan | 0.40 | 53.0 |
| Styrene | 55.00 | 7,172.0 |
| Butadiene-1,3 | 43.10 | 5,624.0 |
| Potassium Persulfate | 0.50 | 65.0 |
| | | 27,410.8 lbs (Total) |

| REACTION CONDITIONS: | |
|---|---|
| Time (hrs.) | Temperature |
| 0 | 50° C. |
| 1 | 60° C. |
| 2 | 65° C. |
| 4 | 70° C. |
| 6 | 75° C. |
| 8 | 80° C. |
| 10 | 75° C. |

The latex product from the above run using Recipe D had a solids content of about 50% by weight and contained about 1% of residual styrene monomer by weight indicating over 96% conversion of the original monomers. Sufficient dilute sodium hydroxide solution was added to raise its pH to about 6 before subjecting the latex to vacuum-steam stripping to remove residual monomers.

Two finished latex bases were then made up by blending together these separate latexes from said Recipes C and D in the proportions shown below:

| Finished Latex | Latex C | Latex D | Final Solids Content | % Solids from C | % Solids from D |
|---|---|---|---|---|---|
| Base 4 | 36.5% | 63.5% | 45% | 30% | 70% |
| Base 5 | 47.5% | 52.5% | 44% | 40% | 60% |

These Bases 4 and 5 were slightly acidic initially but were promptly rendered alkaline by adding aqua ammonia sufficient to raise the pH of both Bases 4 and 5 to a value between about 8.5 and 9.5.

Satisfactory individual latexes and finished latex bases were also obtained when sodium alkyl sulfate was substituted for AEROSOL A-196 in either or both of the above recipes.

EXAMPLE 3

Typical carpet backing and coating compositions were made by incorporating conventional mineral fillers in samples of the above Latex Bases Nos. 1, 2, 4 and 5 at two different filler loadings, namely 375 parts and 550 parts by weight of total filler per 100 parts of latex solids. All of the formulations were prepared by a standardized procedure in which about 0.5% by weight of tetrasodium pyrophosphate was added first to each Latex Base to serve as dispersing agent, followed by the mineral fillers plus supplemental water to adjust total solids content, and with a final adjustment of viscosity to a prescribed level by minor incremental additions of a 10% by weight aqueous solution of sodium polyacrylate thickener obtained from Celanese Chemical Co. under the Trade Name WICA-6087.

Films were cast and cured from each of these mineral filled coating compositions prepared from each of said four Latex Bases, and specimens of the cured films were tested for L.O.I. value according to ASTM D-2863 with the results summarized in the following table:

| Latex Base No. | L.O.I. VALUE FOR FILLED[A] COMPOSITION CONTAINING: | | | | |
|---|---|---|---|---|---|
| | 375 pts CaCO₃ | 325 pts CaCO₃ 50 pts ATH | 550 pts CaCO₃ | 500 pts CaCO₃ 50 pts ATH | 450 pts CaCO₃ 100 pts ATH |
| 1 | 26% | 30% | — | — | — |
| 2 | — | — | 32% | 34% | 36% |
| 4 | 27% | 31% | — | — | — |
| 5 | — | — | 33% | 36% | 39% |

[A]The CaCO₃ filler used was Q-30 grade from Calcium Carbonate Co. of Quincy, IL. The ATH filler used was RH-130 grade alumina trihydrate from Reynolds Metals Co. of Richmond, VA.

The above two filled compositions made from Latex Base 4 (having a total solids content of about 75% by weight) were also applied as adhesive back-coatings on tufted nylon carpets at a uniform rate of about 32 ounces per square yard and were found to provide commercially acceptable binding action as determined by both peel strength and tuft lock values. Furthermore, specimens of said back-coated carpet were subjected to the Methenamine pill burning test in accordance with the procedure described in ASTM D-2859, and all passed except for one of eight specimens of the carpet back coated with the composition containing only CaCO₃ and no alumina trihydrate.

EXAMPLE 4

Using a half-gallon glass laboratory reactor of about 6 inch diameter equipped with a gasketed, heavy metal, flanged cover plate having pressure tight fittings for a propellor stirrer, pressure gauge, thermocoupled probe, reactant feed lines, dip tube sampling line, pressure relief valve, etc. the following polymerization was conducted after purging the reactor with nitrogen.

| RECIPE K | | |
|---|---|---|
| Ingredient | Parts by Wt. | Amount Charged (gms) |
| Demineralized Water (total) | 164.00 | 656.00 |
| AEROSOL A-196 | 2.80 | 11.20 |
| Monosodium Orthophosphate | 0.10 | 0.40 |
| Methyl Methacrylate | 10.00 | 40.00 |
| Vinylidene Chloride | 90.00 | 360.00 |
| Citric Acid | 0.02 | 0.08 |
| Potassium Persulfate | 0.50 | 2.00 |
| Sodium Dithionite | 0.10 | 0.40 |
| | | 1,070.08 gms (Total) |

| REACTION CONDITIONS: | |
|---|---|
| Time (hrs.) | Temperature |
| 0 | 25° C. |
| 0.5 | 30° C. |
| 1.0 | 35° C. |
| 2.5 | 35° C. |
| 3.5 | 35° C. |
| 4.5 | 38° C. |
| 5.0 | 35° C. |

At the end of said 5 hour run, a stable latex "K" was obtained having a solids content of about 38% by weight, a pH of about 2.5 and a residual vinylidene chloride monomer content of about 500 ppm. After adjusting its pH to about 5 with aqua ammonia some of this latex "K" was added to an equal amount by weight of the latex produced from Recipe D in Example 2 to form a uniform latex base similar to Base 5 of said Example 2.

It was found that a residual vinylidene chloride monomer content of below 250 ppm could be reached at the end of such a 5 hour polymerization run with the above recipe K if the reaction temperature is maintained about 10° C. above the values shown in the above schedule, begining with 40° C. after the first half hour. Furthermore, a still further 10° C. increase in temperature during the final 2½ hours of such a 5 hour run results in a residual vinylidene chloride monomer content below 150 ppm.

EXAMPLE 5

Using the laboratory reactor described in Example 4, another polymerization was conducted in similar fashion using the following recipe and run conditions.

| RECIPE L | | |
|---|---|---|
| Ingredient | Parts by Wt. | Amount Charged (gms) |
| Demineralized Water (total) | 190.00 | 570.00 |
| AEROSOL A-196 | 2.40 | 7.20 |
| Monosodium Orthophosphate | 0.10 | 0.30 |
| Citric Acid | 0.02 | 0.06 |
| Butyl Acrylate | 10.00 | 30.00 |
| Vinylidene Chloride | 90.00 | 270.00 |
| Potassium Persulfate | 0.50 | 1.50 |
| Sodium Dithionite | 0.20 | 0.60 |
| | | 879.66 gms (Total) |

| REACTION CONDITIONS: | |
|---|---|
| Time (hrs.) | Temperature |
| 0 | 25° C. |
| 0.5 | 30° C. |
| 1.5 | 35° C. |
| 2.5 | 35° C. |
| 3.5 | 35° C. |
| 5.0 | 36° C. |
| 6.0 | 35° C. |

The latex "L" thus produced was similar in all respects to latex "K" produced in Example 4 except that its solid content was about 35% by weight.

Latex Base #6 was then made by rapidly mixing together 380 grams of this latex "L" and 620 grams of the latex produced from Recipe D in Example 2. After adjusting the pH of said Base #6 to about 9 by the addition of aqua ammonia, 4.5 grams of tetrasodium pyrophosphate was added thereto followed by 1661 grams of calcium carbonate ( 375 parts per 100 parts latex solids) and 150 grams of water to give a filled latex composition containing about 75% total solids by weight. After adjusting the viscosity of this composition to about 15,000 centipoises (measured on a Brookfield Viscosimeter using a No. 5 spindle @ 20 rpm), it was found to perform adhesive and fire retardant functions equivalent to the composition prepared from Base 4 containing 375 parts of CaCO₃ as described in Example 3.

EXAMPLE 6

Another run was made in the laboratory reactor of the previous Examples using the following recipe and reaction conditions.

RECIPE M

| Ingredient | Parts by Wt. | Amount Charged (gms) |
|---|---|---|
| Demineralized Water (total) | 186.00 | 558.00 |
| AEROSOL A-196 | 4.30 | 12.90 |
| Monosodium Orthophosphate | 0.15 | 0.45 |
| Guar Gum* | 0.15 | 0.45 |
| Citric Acid | 0.03 | 0.09 |
| 2-ethyl hexylacrylate | 18.50 | 55.50 |
| Vinylidene Chloride | 81.50 | 244.50 |
| Potassium Persulfate | 0.45 | 1.35 |
| Sodium Dithionite | 0.15 | 0.45 |
| | | 873.69 gms (total) |

*Obtained from Stein, Hall & Co. under the trade name JAGUAR-A2S.

REACTION CONDITIONS:

| Time (hrs.) | Temperature |
|---|---|
| 0 | 25° C. |
| 0.5 | 30° C. |
| 1.0 | 35° C. |
| 2.0 | 39° C. |
| 3.0 | 40° C. |
| 4.0 | 43° C. |
| 5.0 | 55° C. |
| 6.0 | 51° C. |

The resultant latex "M" was similar in all respects including solids content to latex "L" produced in Example 5. When 380 grams of this latex "M" was substituted for the 380 grams of latex "L" used in making Latex Base #6 in said Example 5, a similar latex Base #7 was formed which was then compounded in the same way with calcium carbonate filler to produce a coating composition containing about 75% total solids by weight. The adhesive and fire retardant properties of said coating composition made from latex Base #7 were equivalent to that made from latex Base #6 but gave cured films and laminates with somewhat greater flexibility and softness.

EXAMPLE 7

Using half-gallon laboratory reactors of the type described in the preceding Examples, two separate latexes were prepared by conducting aqueous emulsion polymerizations "R" and "S" using the recipes and reaction conditions specified below.

RECIPE R

| Ingredient | Parts by Wt. | Amount Charged (gms) |
|---|---|---|
| Demineralized Water (total) | 133.00 | 532.00 |
| AEROSOL A-196 | 4.50 | 18.00 |
| Monosodium Orthophosphate | 0.20 | 0.80 |
| t-dodecyl mercaptan | 0.20 | 0.80 |
| Citric Acid | 0.03 | 0.12 |
| Methyl Acrylate | 10.00 | 40.00 |
| Vinylidene Chloride | 90.00 | 360.00 |
| Potassium Persulfate | 0.40 | 1.60 |
| Sodium Dithionite | 0.10 | 0.40 |
| | | 953.72 gms (total) |

REACTION CONDITIONS:

| Time (hrs.) | Temperature |
|---|---|
| 0 | 25° C. |
| 0.5 | 30° C. |
| 1.0 | 35° C. |
| 2.5 | 35° C. |
| 3.5 | 37° C. |
| 5.0 | 40° C. |
| 5.5 | 36° C. |

The resultant latex "R" had a solids content of about 43%, a pH of about 2.5 and contained less than 500 ppm of vinylidene chloride monomer.

RECIPE S

| Ingredient | Parts by Wt. | Amount Charged (gms) |
|---|---|---|
| P.S. Seed Latex[1] | 26.50 | 104.0 |
| Demineralized Water (total) | 82.40 | 324.0 |
| AEROSOL A-196 | 1.80 | 7.0 |
| Sodium Tripolyphosphate | 0.01 | 0.4 |
| N-methylol acrylamide (60% aqueous solution) | 2.50 | 10.0 |
| Itaconic Acid | 1.50 | 6.0 |
| t-dodecyl mercaptan | 0.80 | 3.2 |
| Styrene | 45.00 | 178.0 |
| Butadiene-1,3 | 51.00 | 200.0 |
| Potassium Persulfate | 0.50 | 2.0 |
| | | 834.6 gms (Total) |

[1]Fine particle size polystyrene latex polymerized in aqueous emulsion (total solids content equals 10% by weight).

REACTION CONDITIONS:

| Time (hrs.) | Temperature |
|---|---|
| 0 | 45° C. |
| 0.5 | 55° C. |
| 1.0 | 60° C. |
| 3.0 | 60° C. |
| 5.0 | 62° C. |
| 6.0 | 65° C. |
| 8.0 | 70° C. |
| 9.0 | 75° C. |
| 10.0 | 77° C. |
| 11.0 | 75° C. |

At the end of this run the residual styrene monomer content was about 0.5% indicating over 97% conversion of original monomers, yielding a latex "S" product with a pH of about 4 and a solids content of about 48% by weight. During the vacuum-steam stripping treatment to remove monomers, the solids content was increased to about 50%.

Four finished latex bases were then made up by rapidly mixing latex "R" with latex "S" of this example in two different proportions and similarly latex "R" with the latex obtained from Recipe B back in Example 1 in the same two proportions as outlined in the following table:

| Finished Latex | Pts. SB* Latex per 100 pts. "R" | Final Solids Content | % Solids from Latex "R" |
|---|---|---|---|
| Base 8 | 57.5 pts "S" | 45.5 | 60% |
| Base 9 | 36.8 pts "S" | 45.0 | 70% |
| Base 10 | 57.5 pts "B" | 45.5 | 60% |
| Base 11 | 36.8 pts "B" | 45.0 | 70% |

*styrene-butadiene type latex.

After adjusting the pH of each of the above four bases to about 8.5 by the addition of aqua ammonia, 250 parts by weight of RH-130 grade alumina trihydrate and 50 parts by weight of Harshaw KR grade antimony oxide per 100 parts of latex solids were dispersed into each of Bases 8, 9, 10 and 11 with the aid of a small amount of dispersing agent known as TAMOL L concentrate (an aqueous solution of a condensed naphthalene sulfonic acid containing 47.5% solids by weight, supplied by Rohm & Haas Co.).

Several cast and cured film specimens of uniform thickness were made from each of the four resulting filled latex compositions and subjected to ASTM-2863 determinations of L.O.I. values with the following results:

| Filled Composition from Base No. | Av. L.O.I. Value |
|---|---|
| 8 | 99 |
| 9 | 88 |
| 10 | 100** |
| 11 | 100** |

**These films did not flame freely even in pure oxygen.

It should be understood that the above Examples are given solely for purposes of illustration and guidance as to how to practice the present invention. In addition to the many permissible substitutions and alternative ingredients and conditions already pointed out, it will be obvious to those skilled in the art that there are many minor supplemental ingredients which could be advantageously added to the latex bases of this invention for special effects and purposes, such as pigments, antioxidants, heat stabilizers, plasticizers, blowing agents, defoamers, etc.

Accordingly, the above examples and specifically suggested alternatives are not to be construed as unduly limiting the scope of the present invention, which is defined only by the claims which follow.

What is claimed is:

1. A flame retardant latex base consisting essentially of a blend of two separately polymerized aqueous latexes each of which has a polymer content of at least about 35% by weight which in the first latex is a copolymer of which about 70 to 92% by weight is derived from vinylidene chloride with the balance being polar monomers which are predominantly lower alkyl esters of acrylic acids and in the second latex is a copolymer derived primarily from butadiene and styrene in weight proportions of between about 1 part butadiene to 9 parts styrene and about 2 parts butadiene to 1 part styrene, the proportion of said first latex comprising at least about 20% but not over about 90% by weight of said blend and sufficient to provide a vinylidene chloride content equivalent to between about 20 and 80% by weight of the total polymer content in said blend.

2. A flame retardant latex base as described in claim 1, wherein from about 80 to about 90% by weight of the polymer content of the first latex is derived from vinylidene chloride and the weight proportion of butadiene to styrene in the polymer content of said second latex is between 1 to 3 and 3 to 2.

3. A flame retardant latex base as described in claim 1, wherein at least about 98% by weight of the polymer content of said first latex is derived from vinylidene chloride plus lower alkyl esters of acrylic acids.

4. A flame retardant latex base as described in claim 1, wherein at least about 95% by weight of the polymer content of said second latex is derived from butadiene and styrene.

5. A flame retardant latex base as described in claim 4, wherein up to about 5% by weight of the polymer content of said second latex represents low molecular functional monomers chosen from the group consisting of unsaturated aliphatic acids, amides and N-substituted amide derivatives.

6. A flame retardant latex base as described in claim 1, wherein the polymer content of the first latex is between about 35 and 50% by weight and the polymer content of second latex is between about 35 and 55% by weight.

7. A method of preparing flame retardant latex bases comprising copolymerizing at temperatures predominantly between about 35° and about 65° C. vinylidene chloride and polar monomers which are predominantly lower alkyl esters of acrylic acids in an acidic aqueous emulsion with a redox-type, water soluble catalyst system comprising a free-radical generating initiator and an effective and compatible sulfoxy reducing agent promotor under conditions yielding a stable aqueous latex containing at least about 35% by weight of a resinous copolymer of which about 70 to 92% by weight represents vinylidene chloride, adjusting the pH of said latex to between about 4 and about 9 and blending same with at least about one ninth but not over about four times its weight of a stable aqueous latex having a pH of between about 5 and about 10 and containing at least about 35% by weight of a copolymer derived primarily from styrene and butadiene in weight proportions of between about 1 part butadiene to 9 parts styrene and 2 parts butadiene to 1 part styrene.

8. A method of preparing flame retardant latex bases as described in claim 7, wherein the pH to which the vinylidene chloride copolymer latex is adjusted is on the same side of 7 as that of the styrene-butadiene latex with which it is blended.

9. A method as described in claim 8, wherein the pH's of both latexes are substantially above 7.

10. A method of preparing flame retardant latex bases as described in claim 7, wherein vinylidene chloride represents about 80 to about 90% by weight of said resinous copolymer and styrene and butadiene together represent at least 95% by weight of the other copolymer, with styrene alone representing at least 30% and butadiene alone at least 10% by weight thereof.

11. A method as described in claim 10, wherein butadiene alone represents at least 25% by weight of said other copolymer.

12. A method of preparing flame retardant latex bases as described in claim 7, wherein the temperatures at which said vinylidene chloride and lower alkyl acrylate monomers are copolymerized are predominantly between about 40° and 60° C. and the free-radical generating initiator is a water soluble peroxy compound.

13. A method of preparing flame retardant latex bases as described in claim 7, wherein the copolymerization of the vinylidene chloride and lower alkyl acrylate monomers is carried substantially to completion as shown by a residual content of vinylidene chloride of less than about 1000 ppm by weight.

14. A method of preparing flame retardant latex bases comprising:
(a) copolymerizing at temperatures predominantly between about 35° and about 65° C. vinylidene chloride and lower alkyl acrylate monomers in an acidic aqueous emulsion with a water-soluble, redox catalyst system essentially free of multivalent metals and comprising a peroxysulfuric free-radical generating initiator and a sulfoxy reducing agent promoter under conditions yielding a stable aqueous latex containing at least about 35% of a resinous copolymer of which about 70 to 92% by weight represents vinylidene chloride, (b) copolymerizing in an aqueous emulsion at a pH of between about 4 and 10, in the presence of a water soluble free-radical initiator and at temperatures predominantly between about 50° and about 85° C. a monomer mixture at least 95% by weight of which is composed of styrene and butadiene in weight proportions of between about 1 part butadiene to 9 parts styrene and about 2 parts butadiene to 1 part styrene under conditions yielding a stable aqueous latex containing at least 35% by weight of polymeric solids, (c) subjecting the latex from step (b) to vacuum stripping to remove most of the unreacted residual monomer content therefrom, (d) adjusting the pH of the latex from step (a) to a value in the range between about 4 and about 9 which value is within approximately 1 pH unit of the pH of said latex from steps (b) and (c), and (e) blending together the two latexes thus prepared in proportions such that between about 20 and about 80% of the total polymer content of the resultant blend is derived from vinylidene chloride.

15. A method of preparing flame retardant latex bases as described in claim 14, wherein the pH to which the latex from step (a) is adjusted in step (d) is on the same side of 7 as that of the latex from steps (b) and (c).

16. A method of preparing flame retardant latex bases as described in claim 14, wherein the mixture of monomers copolymerized in step (b) includes up to about 5% by weight of low molecular functional monomers chosen from the group consisting of unsaturated acids, amides and N-substituted amides.

17. A method of preparing flame retardant latex bases as described in claim 16, wherein said low molecular functional monomers include at least one unsaturated aliphatic carboxylic acid and said step (b) is carried out at a pH substantially below 7.

18. A method of preparing flame retardant latex bases as described in claim 14, wherein a minor proportion of a compatible seed latex is included initially in the aqueous emulsion of said step (b).

19. A method of preparing flame retardant latex bases as described in claim 14, wherein substantially complete conversion of monomers is attained in step (a) in a residence time of less than about 6 hours and at least about 95% conversion of monomers is attained in step (b) in a residence time of less than about 12 hours.

20. A method as described in claim 19, wherein the same type of acid-stable, anionic surfactant is used to maintain a stable emulsion in both of steps (a) and (b).

* * * * *